(12) United States Patent
Gong et al.

(10) Patent No.: US 10,552,078 B2
(45) Date of Patent: Feb. 4, 2020

(54) DETERMINING AN EFFECTIVE CAPACITY OF A DRIVE EXTENT POOL GENERATED FROM ONE OR MORE DRIVE GROUPS IN AN ARRAY OF STORAGE DRIVES OF A DATA STORAGE SYSTEM THAT USES MAPPED RAID (REDUNDANT ARRAY OF INDEPENDENT DISKS) TECHNOLOGY

(71) Applicant: EMC IP Holding Company LLC, Hopkinton, MA (US)

(72) Inventors: Shaoqin Gong, Beijing (CN); Jian Gao, Beijing (CN); Hongpo Gao, Beijing (CN); Geng Han, Beijing (CN); Jibing Dong, Beijing (CN); Jamin Kang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 145 days.

(21) Appl. No.: 15/888,434

(22) Filed: Feb. 5, 2018

(65) Prior Publication Data
US 2019/0235781 A1    Aug. 1, 2019

(30) Foreign Application Priority Data

Jan. 31, 2018 (CN) .......................... 2018 1 0099155

(51) Int. Cl.
*G06F 12/02* (2006.01)
*G06F 3/06* (2006.01)
*G06F 11/20* (2006.01)

(52) U.S. Cl.
CPC .......... *G06F 3/0644* (2013.01); *G06F 3/0619* (2013.01); *G06F 3/0665* (2013.01);
(Continued)

(58) Field of Classification Search
CPC ..................................................... G06F 3/0644
See application file for complete search history.

(56) References Cited

U.S. PATENT DOCUMENTS 5,579,475 A    11/1996 Blaum et al.
5,758,118 A    5/1998 Choy et al.
(Continued)

OTHER PUBLICATIONS

Blaum et al., "EVENODD: An Optical Scheme for Tolerating Double Disk Failures in RAID Architectures", RAID Architectures: IBM Research Report, RJ 9506, Sep. 1993, pp. 245-254.
(Continued)

*Primary Examiner* — Chae M Ko
(74) *Attorney, Agent, or Firm* — BainwoodHuang

(57) ABSTRACT

Technology for determining an effective capacity of a drive extent pool that is generated from at least one group of storage drives. A sub-group of storage drives having relatively higher physical capacities is selected from the group. The number of storage drives in the sub-group is equal to a total number of drive extents indicated by each entry in a RAID mapping table. Each storage drive in the sub-group is assigned an individual effective capacity equal to an individual physical capacity of a storage drive in the sub-group having the smallest individual physical capacity. Each storage drive in the group not contained in the sub-group is assigned an individual effective capacity equal to its own physical capacity. An effective capacity of the drive extent pool is set to a sum of the all the individual effective capacities assigned to the storage drives in the group of storage drives.

19 Claims, 8 Drawing Sheets

(52) U.S. Cl.
CPC ........ *G06F 3/0689* (2013.01); *G06F 11/2094* (2013.01); *G06F 2201/805* (2013.01); *G06F 2201/82* (2013.01)

(56) References Cited

U.S. PATENT DOCUMENTS

| | | | |
|---|---|---|---|
| 5,875,457 | A | 2/1999 | Shalit |
| 6,567,889 | B1 | 5/2003 | DeKoning et al. |
| 6,857,059 | B2 | 2/2005 | Karpoff et al. |
| 6,901,478 | B2 | 5/2005 | Bak et al. |
| 7,111,117 | B2 | 9/2006 | Franklin et al. |
| 7,409,625 | B2 | 8/2008 | Corbett et al. |
| 8,316,288 | B2 | 11/2012 | Nowoczynski et al. |
| 8,463,992 | B2 | 6/2013 | Kelton et al. |
| 8,914,578 | B2 | 12/2014 | DeNeui et al. |
| 9,417,822 | B1 | 8/2016 | Ballance |
| 2003/0074527 | A1* | 4/2003 | Burton ................. G06F 3/0601 711/114 |
| 2004/0260967 | A1 | 12/2004 | Guha et al. |
| 2005/0086431 | A1* | 4/2005 | Kaneda ................. G06F 3/0605 711/114 |
| 2006/0075283 | A1 | 4/2006 | Hartung et al. |
| 2008/0256427 | A1 | 10/2008 | He et al. |
| 2009/0254468 | A1* | 10/2009 | Acedo ................. G06F 3/0605 705/35 |
| 2011/0145535 | A1 | 6/2011 | Kusama et al. |
| 2011/0191629 | A1* | 8/2011 | Daikokuya ............. G06F 12/06 714/20 |
| 2012/0137065 | A1 | 5/2012 | Odenwald et al. |
| 2016/0216890 | A1* | 7/2016 | Carpenter ............. G06F 3/0608 |
| 2016/0224244 | A1* | 8/2016 | Gensler, Jr. ........... G06F 3/0604 |
| 2017/0024142 | A1* | 1/2017 | Watanabe ................ G06F 3/06 |
| 2017/0270000 | A1* | 9/2017 | Gao ...................... G06F 3/0604 |
| 2018/0121095 | A1* | 5/2018 | Atia ...................... G06F 3/0604 |
| 2019/0129815 | A1* | 5/2019 | Gao ...................... G06F 11/1084 |

OTHER PUBLICATIONS

Miller, Scott A., "Comparing RAID 10 and RAID 01", SMB IT Journal; Jul. 30, 2014; <<http://www.smbitjournal.com/2014/07/comparing-raid-10-and-raid-01/>>article accessed Mar. 21, 2017, 6 pages.

Patterson, et al., "A Case for Redundant Arrays of Inexpensive Disks (RAID)", Proceedings of the 1988 ACM SIGMOD International Conference on Management of Data, ACM, 1988, pp. 109-116.

Perumal, et al., "A Tutorial on RAID Storage Systems", CS04-05-00. May 6, 2004. Data Network Architectures Group. Department of Computer Science. University of Capetown, 23 pages.

"Logical Block Addressing", DEW Associates Corporation, 1995-2002; <<http://www.dewassoc.com/kbase/hard_drives/lba.htm>>article was accessed on Sep. 6, 2017, 2 pages.

* cited by examiner

DETERMINING AN EFFECTIVE CAPACITY OF A DRIVE EXTENT POOL GENERATED FROM ONE OR MORE DRIVE GROUPS IN AN ARRAY OF STORAGE DRIVES OF A DATA STORAGE SYSTEM THAT USES MAPPED RAID (REDUNDANT ARRAY OF INDEPENDENT DISKS) TECHNOLOGY

TECHNICAL FIELD

The present disclosure relates generally to intelligent data storage systems that provide RAID (Redundant Array of Independent Disks) technology, and more specifically to technology for determining an effective capacity for a drive extent pool generated from one or more drive groups in an array of storage drives of a data storage system that uses mapped RAID (Redundant Array of Independent Disks) technology.

BACKGROUND

Data storage systems are arrangements of hardware and software that typically include multiple storage processors coupled to arrays of non-volatile data storage devices, such as magnetic disk drives, electronic flash drives, and/or optical drives. The storage processors service host I/O operations received from host machines. The received I/O operations specify one or more storage objects (e.g. logical disks or "LUNs") that are to be written, read, created, or deleted. The storage processors run software that manages the received I/O operations and performs various data processing tasks to organize and secure the host data that is received from the host machines and stored on the non-volatile data storage devices.

Some existing data storage systems have provided RAID (Redundant Array of Independent Disks) technology. RAID is a data storage virtualization/protection technology that combines multiple physical drives into a single logical unit to provide data redundancy and/or performance improvement. Data written to the logical unit may be distributed across the drives in one of several ways, referred to as RAID levels, depending on the required levels of redundancy and performance. Some RAID levels employ data striping ("striping") to improve performance. In general, striping involves segmenting received host data into logically sequential blocks (e.g. sequential blocks in an address space of a logical storage object), and then storing data written to consecutive blocks in the logical sequence of blocks onto different drives. A series of consecutive logically sequential data blocks that are stored across different drives may be referred to as a RAID "stripe". By spreading data segments across multiple drives that can be accessed concurrently, total data throughput can be increased.

Some RAID levels employ a "parity" error protection scheme to provide fault tolerance. When parity protection is used, one or more additional parity blocks are maintained in each stripe. For example, a parity block for a stripe may be maintained that is the result of performing a bitwise exclusive "OR" (XOR) operation across the data blocks of the stripe. When the storage for a data block in the stripe fails, e.g. due to a drive failure, the lost data block can be recovered by performing an XOR operation across the remaining data blocks and the parity block.

One example of a RAID configuration that uses block level striping with distributed parity error protection is 4D+1P ("four data plus one parity") RAID-5. In 4D+1P RAID-5, each stripe consists of 4 data blocks and a block of parity information. In a traditional 4D+1P RAID-5 disk group, at least five storage disks are used to store the data and parity information, so that each one of the four data blocks and the parity information for each stripe can be stored on a different disk. Further in traditional RAID, a spare disk is also kept available to handle disk failures. In the event that one of the disks fails, the data stored on the failed disk can be rebuilt onto the spare disk by performing XOR operations on the remaining data blocks and the parity information on a per-stripe basis. 4D+1P RAID-5 is generally considered to be effective in preventing data loss in the case of single disk failures. However, data may be lost when two or more disks fail concurrently.

Other RAID configurations may provide data protection even in the event that multiple disks fail concurrently. For example, 4D+2P RAID-6 provides striping with double distributed parity information that is provided on a per-stripe basis. The double parity information maintained by 4D+2P RAID-6 enables data protection for up to a maximum of two concurrently failing drives.

SUMMARY

Data storage systems providing traditional RAID data protection have significant limitations with regard to the ability to add new disks, and with regard to the amount of time required to rebuild data in the event of a disk failure. Specifically, traditional RAID systems do not support the addition of new disks on an individual disk basis, and instead require that new storage capacity be added only in numbers of disks equal to the number of disks that is required to support the specific RAID configuration, i.e. equal to the width of the RAID stripe being used. Accordingly, for traditional 4D+1P RAID-5 configurations, new disks can only be added to a traditional RAID system in increments of five disks at a time. For traditional 4D+2P RAID-6 configurations, new disks can only be added to traditional RAID systems in increments of six disks. As the capacity of individual disks has increased over time with the introduction of new storage technologies, this inflexibility in terms of adding new capacity to traditional RAID systems has become increasingly burdensome and impractical.

Also as individual disk capacity has increased, the time required by traditional RAID systems to rebuild data of an entire failed disk onto a single dedicated spare disk has increased, and the write bandwidth of the single dedicated spare disk has become a significant performance bottleneck with regard to total rebuild time. Moreover, while data previously stored on the failed disk is being rebuilt on the spare disk, concurrent failure of one or more additional disks in a traditional RAID system during the rebuilding process may introduce the risk of data loss.

The mapped RAID technology described herein improves on traditional RAID technology by allowing for the addition of individual non-volatile data storage drives to a data storage system in order to increase the storage capacity of the system, and also addresses the problem of long rebuild times in traditional RAID caused by write bandwidth bottlenecks when writing to dedicated spare disks. In the mapped RAID technology described herein, each storage drive is divided into multiple contiguous regions of non-volatile data storage referred to as "drive extents". A drive extent pool is generated from the drive extents, and maintains indications of the drive extents, as well as indications of whether individual drive extents have been allocated or are available for allocation. A RAID extent table is generated that contains RAID extent entries, each one of which indicates a set of drive extents that have been allocated from the drive extent pool to that RAID extent entry. The set of drive extents indicated by each RAID extent entry are used to store host data that is written to a corresponding portion of a logical address space representing the non-volatile storage accessed through the RAID mapping table and associated parity data, e.g. to store the host data written to a corresponding portion of the logical address space of a logical storage object representing the non-volatile storage accessed through the RAID mapping table and associated parity data. Each RAID extent entry in the RAID extent table indicates a unique set of drive extents allocated from the drive extent pool, and each one of the drive extents allocated to any individual RAID extent must be located on a different storage drive. In this way, the drive extents indicated by a RAID extent entry are used to store the blocks of data and the parity information for a stripe of non-volatile data storage represented by that RAID extent entry. Accordingly, the total number of drive extents indicated by each RAID extent entry in the RAID extent table may be the same as the number of disks used in a traditional RAID system to store data blocks and parity information for the same RAID level. For example, in a mapped RAID system supporting a 4D+1P RAID-5 configuration, each RAID extent entry in the RAID extent table indicates a total of five drive extents, four of which are used to store the four blocks of host data, and one of which is used to store the parity information of the stripe represented by the RAID extent. In a 4D+2P RAID-6 mapped RAID configuration, two parity information blocks are indicated by each RAID extent entry to provide an increased level of fault tolerance, and each RAID extent entry in the RAID extent table indicates a total of six drive extents.

In the event that a drive fails in a mapped RAID system, spare drive extents can be allocated from the drive extent pool that are located on multiple storage drives that contribute to the drive extent pool in order to replace the drive extents located in the failed drive, thus advantageously increasing parallel processing by spreading the rebuild read and write operations across multiple storage drives, and effectively eliminating the write bandwidth bottleneck previously caused by traditional RAID's reliance on rebuilding to a single dedicated spare disk. In this way, mapped RAID can reduce rebuild time in the face of a single drive failure.

In order for a data storage system that uses mapped RAID technology to expose one or more storage objects that represent the non-volatile storage accessed through a RAID mapping table, the capacity of the drive extent pool from which drive extents are allocated must be accurately determined. Otherwise, in the case where a drive extent pool capacity is generated that is higher than the actual drive extent pool capacity, a storage object may be exposed that is larger than can be supported by the actual capacity of the storage pool, potentially resulting in a failure when attempting to store host data written to the storage object. In the case where a drive extent pool capacity is generated that is lower than can be supported by the storage capacity of the drive extent pool, a storage object may be exposed that is smaller than can be supported by storage capacity of the storage pool, potentially resulting in wasted storage capacity.

In some traditional RAID configurations in which all storage drives in a RAID group were required to have the same physical capacity, a total storage capacity could be determined by summing the physical capacities of all storage drives in the RAID group. However, the effective capacity of a drive extent pool as described herein cannot be determined by simply summing the physical capacities of all the storage drives from which the drive extent pool is generated, particularly in the case where the storage drives from which the drive extent pool is generated have multiple, different physical capacities. Specifically, in the case where the drive extent pool is generated from a group of storage drives that have multiple, different physical capacities, an effective capacity of each individual storage drive in the group must be determined, because the effective capacity of one or more of the storage drives in the group may be smaller than its physical capacity. For example, consider a case in which storage drives from a group of six storage drives numbered Drive 0 through Drive 5 are used to generate a drive extent pool, and in which each of Drive 0 through Drive 4 have a physical capacity of 500 gigabytes, while Drive 5 has a physical capacity of 1 terabyte. In the case where the drive extent size is 10 gigabytes, each one of Drive 0 through Drive 4 have 50 drive extents, while Drive 5 has 100 drive extents. For a RAID configuration of 4D+1P RAID-5, each RAID extent entry in the RAID mapping table indicates five drive extents, each of which must be located on a different storage drive. If the number of drive extents located in Drive 5 that are allocated from the drive extent pool is 'x', then 4x drive extents located in the storage drives Drive 0 through Drive 4 must also be allocated from the drive extent pool. Since Drive 0 through Drive 4 each have 50 drive extents, 4x must accordingly be less than or equal to 250. As a result, the effective capacity of Drive 5 is actually only 250 integer divided by 4, which is 62 drive extents (620 gigabytes). Simply summing the physical capacities of Drive 0 through Drive 5 to determine the capacity of the drive extent pool generated from such a group of storage drives would therefore mistakenly result in a drive extent pool capacity that is higher than the actual effective capacity of the drive extent pool.

In order to address the above described and other shortcomings of previous technologies, technology is disclosed herein for providing RAID (Redundant Array of Independent Disks) data protection for at least one storage object in a data storage system that includes a storage processor and at least one group of storage drives connected to the storage processor. In the technology described herein, a drive extent pool is generated from the group of storage drives. The drive extent pool indicates the drive extents located in the storage drives, and whether each drive extent has been allocated, or is available for allocation. Each drive extent indicated by the drive extent pool is a contiguous region of non-volatile data storage located in one of the storage drives contained in the group of storage drives. Each one of the drive extents indicated by the drive extent pool has the same size, which is equal to a predetermined drive extent size.

Further in the disclosed technology, a RAID mapping table is generated. The RAID mapping table contains multiple RAID extent entries. Each one of the RAID extent entries indicates a unique set of drive extents that are allocated from the drive extent pool to the RAID extent entry. The drive extents that are indicated by a RAID extent entry are used to persistently store host data written to a portion of an address space of the storage object corresponding to the RAID extent entry, and associated parity data. Each RAID extent entry indicates the same total number of drive extents. Drive extents are allocated to RAID extent entries in the RAID mapping table such that no two drive extents indicated by any single RAID extent entry are located on the same storage drive.

The disclosed technology determines an effective capacity of the drive extent pool at least in part by first generating a minimum drive count that is equal to the total number of drive extents indicated by each RAID extent entry plus one.

The disclosed technology then selects a sub-group of storage drives from the group of storage drives. The selected sub-group contains storage drives in the group of storage drives having individual physical capacities that are not less than the physical capacity of any storage drive not contained in the selected sub-group. The total number of storage drives selected for the selected sub-group is equal to the minimum drive count. An individual effective capacity is assigned to each one of the storage drives contained in the selected sub-group. The individual effective capacity assigned to each one of the storage drives contained in the selected sub-group is equal to an individual physical capacity of a storage drive contained in the selected sub-group that has a smallest individual physical capacity of any storage drive contained in the selected sub-group. An individual effective capacity is also assigned to each one of the storage drives in the group of storage drives that is not contained in the selected sub-group. The individual effective capacity assigned to each one of the storage drives in the group of storage drives that is not contained in the selected sub-group is equal to the physical capacity of that storage drive.

The disclosed technology generates a total effective capacity of the group of storage drives that is equal to a sum of the all the individual effective capacities assigned to the storage drives in the group of storage drives, and sets the effective capacity of the drive extent pool to the total effective capacity of the group of storage drives.

In some embodiments, the disclosed technology selects the sub-group of storage drives from the group of storage drives at least in part by creating a sorted drive list representing each of the individual storage drives in the group of storage drives. The sorted drive list is sorted in descending order of storage drive physical capacity, such that storage drives in the group of storage drives with higher individual physical capacities are represented closer to a top of the sorted drive list. The disclosed technology then selects the sub-group of storage drives using the sorted drive list, by selecting minimum drive count number of storage drives that are that are represented at the top of the sorted drive list.

In some embodiments, multiple groups of storage drives are connected to the storage processor. In such embodiments, the effective capacity of the drive extent pool is set to the total effective capacity of the group of storage drives by generating a total effective capacity of each group of storage drives, generating a sum of the total effective capacities of the groups of storage drives, and setting the effective capacity of the drive extent pool to the sum of the total effective capacities of the multiple groups of storage drives.

In some embodiments, the storage processor detects a change in a total number of storage drives connected to the storage processor. In such embodiments, the effective capacity of the drive extent pool may be determined in response to detecting the change in the total number of storage drives connected to the storage processor.

In some embodiments, the storage processor may detect the change in the total number of storage drives connected to the storage processor by detecting that at least one new storage drive has been added to the storage drives connected to the storage processor, such that the total number of storage drives connected to the storage processor is increased.

In some embodiments, the storage processor may detect the change in the total number of storage drives connected to the storage processor at least in part by detecting that at least one storage drive has been removed from the storage drives connected to the storage processor, such that the total number of storage drives connected to the storage processor is decreased.

In some embodiments, the storage processor may use the effective capacity of the drive extent pool to set a size of the storage object, such that the size of the storage object is set to a value that is less than the effective capacity for the drive extent pool.

In some embodiments, the multiple groups of storage drives may be made up of multiple partnership groups, including at least a first partnership group and a second partnership group. In such embodiments, multiple unallocated drive extents located in storage drives contained in the first partnership group are available as free drive extents to be allocated, in response to detecting a failure of a storage drive contained in the first partnership group, to replace drive extents located in the failed storage drive contained in the first partnership group. Further in such embodiments, multiple unallocated drive extents located in storage drives contained in the second partnership group are available as free drive extents to be allocated, in response to detecting a failure of a storage drive contained in the second partnership group, to replace drive extents located in the failed storage drive contained in the second partnership group.

Embodiments of the disclosed technology may provide significant advantages over previous technical solutions. For example, the disclosed technology determines the effective capacity of a drive extent pool by accurately assigning an effective capacity to each individual storage drive in the group of storage drives used to generate the drive extent pool. The disclosed technology may correctly assign an effective capacity to one or more of the storage drives in the group that is smaller than the storage drive's physical capacity. The disclosed technology thereby enables a data storage system that uses mapped RAID technology to expose one or more storage objects that represent the non-volatile storage accessed through a RAID mapping table based on an accurately determined capacity of the drive extent pool from which drive extents are allocated.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments of the invention will now be described. It should be understood that the embodiments described herein are provided only as examples, in order to illustrate various features and principles of the disclosed technology, and that the invention is broader than the specific embodiments described herein.

Figure 1:
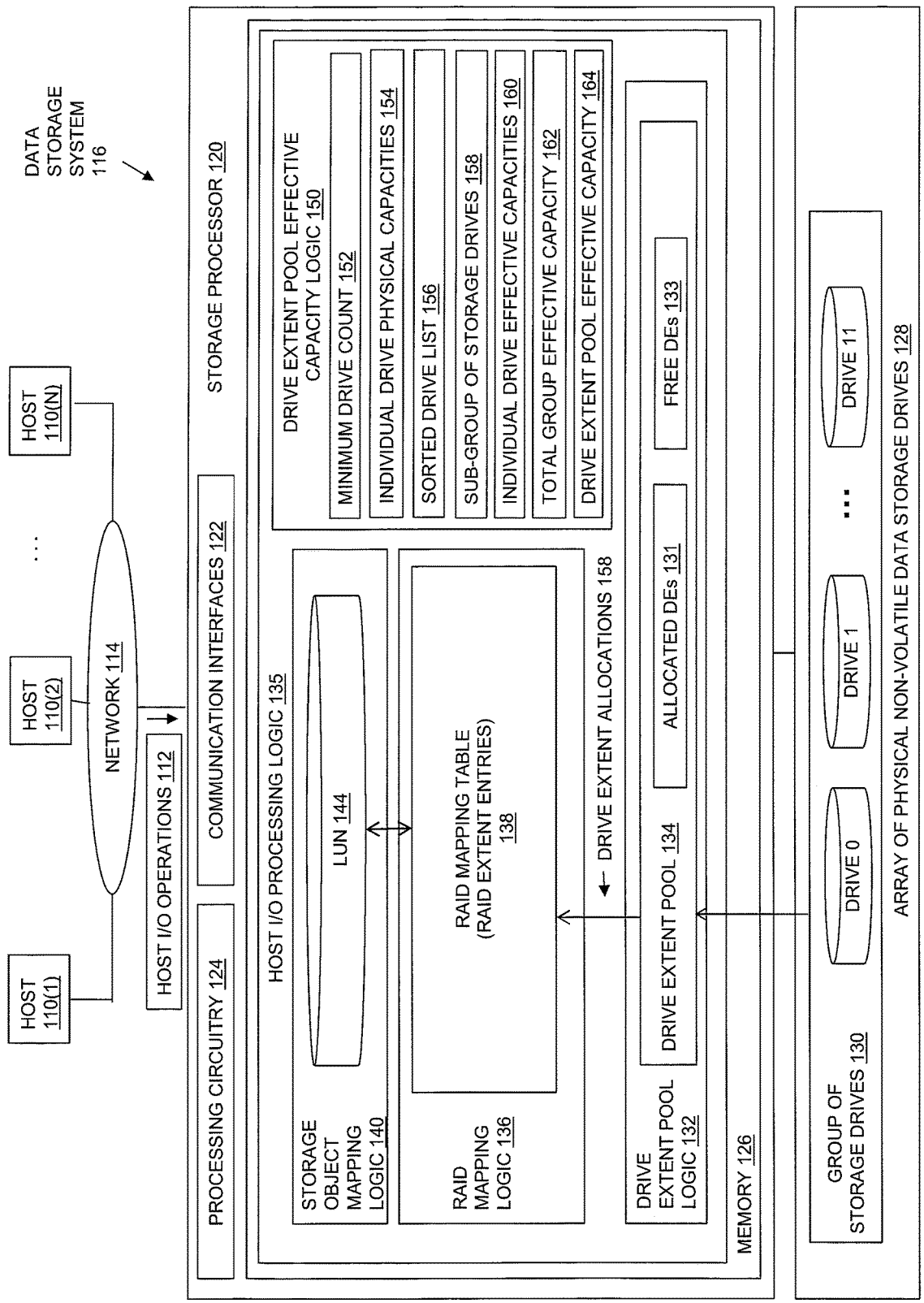
FIG. 1 is a block diagram showing an operational environment for the disclosed technology, including an example of a data storage system in which the disclosed technology may be embodied, with a group of storage drives.

FIG. 1 is a block diagram showing an operational environment for the disclosed technology, including an example of a data storage system in which the disclosed technology may be embodied. The operational environment of FIG. 1 includes some number of Host Computing Devices 110, referred to as "hosts" and shown for purposes of illustration by Hosts 110(1) through 110(N), that access data storage provided by Data Storage System 116, for example over one or more computer networks, such as a local area network (LAN), and/or a wide area network (WAN) such as the Internet, etc., shown in FIG. 1 by Network 114. Data Storage System 116 includes at least one Storage Processor 120 and an Array of Non-Volatile Data Storage Drives 128. Storage Processor 120 may, for example, be provided as a circuit board assembly, or "blade," which plugs into a chassis that encloses and cools multiple storage processors, and that has a backplane for interconnecting storage processors. However, no particular hardware configuration is required, and Storage Processor 120 may be embodied as any specific type of device that is capable of processing host input/output (I/O) operations received from Hosts 110 (e.g. I/O read and I/O write operations, create storage object operations, delete storage object operations, etc.).

The Array of Non-Volatile Data Storage Drives 128 may include physical data storage drives such as magnetic disk drives, solid state drives, hybrid drives, and/or optical drives. Array of Non-Volatile Data Storage Drives 128 may be directly physically connected to and/or contained within Storage Processor 120, and/or may be communicably connected to Storage Processor 120 by way of one or more computer networks, e.g. including or consisting of a Storage Area Network (SAN) or the like.

A Memory 126 in Storage Processor 120 stores program code that is executable on Processing Circuitry 124. Memory 126 may include volatile memory (e.g. RAM), and/or other types of memory. The Processing Circuitry 124 may, for example, include or consist of one or more microprocessors, e.g. central processing units (CPUs), multi-core processors, chips, and/or assemblies, and associated circuitry. Processing Circuitry 124 and Memory 126 together form control circuitry, which is configured and arranged to carry out various methods and functions as described herein. The Memory 126 stores a variety of software components that may be provided in the form of executable program code. For example, as shown in FIG. 1, Memory 126 may include software components such as Host I/O Processing Logic 135. When the program code is executed by Processing Circuitry 124, Processing Circuitry 124 is caused to carry out the operations of the software components. Although certain software components are shown and described for purposes of illustration and explanation, those skilled in the art will recognize that Memory 126 may include various other software components, such as an operating system, various applications, processes, etc.

During operation, Drive Extent Pool Logic 132 generates Drive Extent Pool 134 by first dividing each one of the physical data storage drives in the Initial Group of Storage Drives 130 into multiple, equal size drive extents, each of which consists of physically contiguous non-volatile data storage located on a drive. For example, Drive Extent Pool Logic 132 may divide each one of the physical data storage drives in the Array of Physical Non-Volatile Data Storage Devices 128 into a fixed number of equal size drive extents of physically contiguous non-volatile storage, and then store an indication of each one of the resulting drive extents to Drive Extent Pool 134. For example, each indication of a drive extent that is stored into Drive Extent Pool 134 may include a pair of indexes "m|n", in which "m" indicates a drive index of the storage drive on which the drive extent is located (e.g. a numeric drive number within Array of Physical Non-Volatile Storage Drives 128, a slot number within which the physical drive located, or a textual drive name, etc.), and "n" indicates an index of the drive extent within the storage drive (e.g. a numeric drive extent number, a block offset, a sector number, etc.). In embodiments in which storage drives are indexed within Array of Physical Non-Volatile Data Storage Devices 128 starting with 0, and in which drive extents are indexed within the storage drive that contains them starting with 0, a first drive extent of a first storage drive within Array of Physical Non-Volatile Data Storage Drives 128 may be represented by "0|0", a second drive extent within the first physical data storage drive within Array of Physical Non-Volatile Data Storage Drives 128 may be represented by "0|1", and so on. Drive Extent Pool Logic 132 may further maintain an allocation status for each one of the drive extents indicated in Drive Extent Pool 134, such that Drive Extent Pool 134 also stores, for each drive extent indicated by Drive Extent Pool 134, an indication of whether that drive extent has been allocated, or is instead available for allocation (e.g. an allocated bit flag or the like may be stored in Drive Extent Pool 134 for each drive extent). Accordingly, as shown in FIG. 1, the drive extents indicated by Drive Extent Pool 134 may each either be i) one of Allocated Drive Extents 131 that have been allocated to a RAID extent entry in the RAID Mapping Table 138, or ii) one of Free Drive Extents 133 that are unallocated "spare" drive extents available for future allocation to RAID extent entries in RAID Mapping Table 138, e.g. in response to a failure condition, to replace, within RAID extent entries in RAID Mapping Table 138, drive extents located in a failed drive contained in the Group of Storage Drives 130.

The Group of Storage Drives 130 from which Drive Extent Pool 134 is generated may consist of all the storage drives in Array of Physical Non-Volatile Data Storage Drives 128, or may be one of multiple storage drives in Array of Physical Non-Volatile Data Storage Drives 128. Accordingly, the disclosed technology may be embodied or configured such that Array of Physical Non-Volatile Data Storage Drives 128 includes multiple separate groups of storage drives.

The size of the drive extents into which each storage drive in the Group of Storage Drives 130 is divided is the same for every storage drive in the Group of Storage Drives 130. Various specific sizes of drive extents may be used. For example, in some embodiments each drive extent may have a size of 10 gigabytes. Larger or smaller drive extent sizes may be used in the alternative. Any specific number of storage drives may be contained in the Group of Storage Drives 130 and divided into equal size drive extents to generate Drive Extent Pool 134. The data storage drives in the Group of Storage Drives 130 may have a variety of different physical capacities, resulting in different storage drives being divided into different numbers of equal size drive extents.

After dividing each one of the storage drives in the Group of Storage Drives 130 into multiple, equal size drive extents of physically contiguous non-volatile data storage, and storing indications of the drive extents to Drive Extent Pool 134, drive extents may be allocated at 158 to specific RAID extent entries contained in RAID Mapping Table 138. Each one of the RAID extent entries in RAID Mapping Table 138 indicates a unique set of drive extents that are allocated from the Drive Extent Pool 134 to that RAID extent entry. The drive extents allocated to each RAID extent entry are used to store host data that is written to a corresponding portion (a "RAID extent") of a logical address space of the storage object LUN 144, and associated parity data. For example, in a 4D+1P RAID-5 configuration, five drive extents may be allocated from Drive Extent Pool 134 to each individual RAID extent entry contained in RAID Mapping Table 138. Subsequently, for each RAID extent entry, four of the five drive extents allocated to the RAID extent entry may be used to store host data that is directed to a portion of an address space of LUN 144 that corresponds to that specific RAID extent entry, and the fifth drive extent allocated to the RAID extent entry may be used to store parity data to be used to recover the host data stored on one of the other four drive extents in the event of a storage drive failure.

In some embodiments, drive extents are allocated to RAID extent entries in the RAID Mapping Table 138, such that no two drive extents indicated by any single RAID extent entry are located in the same physical storage drive.

A drive extent may be released (i.e. deallocated) from one RAID extent entry, and thereby made available for allocation to a different RAID extent entry, e.g. when the drive extent is no longer needed to store host data written to the portion of the address space of LUN 144 that corresponds to that RAID extent entry.

When a drive extent is allocated to a RAID extent entry, an indication of the drive extent is stored in the RAID extent entry. For example, a drive extent allocated to a RAID extent entry may be indicated within that RAID extent entry by a pair of indexes "m|n" that are stored in the RAID extent entry, in which "m" indicates a drive index of the storage drive on which the drive extent is located (e.g. a numeric drive number within Array of Physical Non-Volatile Storage Drives 128, a slot number within which the physical drive located, or a textual drive name, etc.), and "n" indicates an index of the drive extent within the storage drive (e.g. a numeric drive extent number, a block offset, a sector number, etc.). In embodiments in which storage drives are indexed within Array of Physical Non-Volatile Data Storage Devices 128 starting with 0, and in which drive extents are indexed within the storage drive that contains them starting with 0, a first drive extent of a first physical data storage drive within Array of Physical Non-Volatile Storage Drives 128 may be represented in a RAID extent entry to which it is allocated by "0|0", a second drive extent within the first physical data storage drive within Array of Physical Non-Volatile Data Storage Drives 128 may be represented in a RAID extent entry to which it is allocated by "0|1", and so on.

Host I/O Processing Logic 135 may expose one or more logical storage objects to Hosts 110 for reading and/or writing host data, so that Hosts 110 can issue Host I/O Operations 112 to specific storage objects, e.g. using names or other identifiers of the storage objects. The storage objects exposed to Host I/O Operations 112 may be written, read, created, and/or deleted by Hosts 110 through Host I/O Operations 112. The storage objects exposed to Hosts 110 may include or consist of logical disks sometimes referred to as "LUNs" such as LUN 144. The storage objects exposed to Hosts 110 may alternatively include or consist of a host file system, virtual volume, and/or some other type of storage object, which Host I/O Processing Logic 135 makes accessible to Hosts 110 for reading and/or writing host data.

Storage Object Mapping Logic 140 may be embodied to direct host data written to individual portions of a logical address space of LUN 144, e.g. to discrete sets of consecutive blocks in the logical address space of LUN 144, to specific individual corresponding RAID extent entries in RAID Mapping Table 138. In this way the host data written to each set of consecutive blocks in the logical address space of LUN 144 is persistently stored in drive extents indicated by a RAID extent entry corresponding to those blocks, and parity information can be calculated and stored in at least one of the drive extents of the same RAID extent entry to support data recovery. For example, an address space of LUN 144 may be made up of a set of sequential, equal size logical blocks of address space. Each host write I/O operation may indicate a specific block to be written within the address space of the LUN 144, e.g. using a logical block number (e.g. a logical block address) or offset into LUN 144. In some embodiments, 4D+1P RAID-5 block level striping with distributed parity error protection may be used, with each RAID stripe consisting of four data blocks and a block of parity information, and each RAID stripe being represented by a single RAID extent entry and mapped to drive extents indicated by that RAID extent entry. In such embodiments, each RAID extent entry may indicate five drive extents. For each set of four consecutive blocks in the logical address space of LUN 144 that are mapped to a single RAID extent entry, host data may be striped across the drive extents indicated by that RAID extent entry by storing host data written to consecutive ones of the four consecutive blocks of the logical address space into different ones of four of the drive extents indicated by that RAID extent entry. Parity information may be calculated and stored in a fifth drive extent indicated by the RAID extent entry, e.g. as an XOR of the host data stored in the other four drive extents indicated by the RAID extent entry. In this way, host data stored in any one of the four drive extents indicated by the RAID extent entry that store host data can be recovered in the event of a failure of a physical data storage drive containing one of the four drive extents indicated by the RAID extent entry that store host data, for example by performing one or more XOR operations on the data stored in the three surviving drive extents indicated by the RAID extent entry that store host data, in combination with the parity information stored in the fifth drive extent indicated by the RAID extent entry.

Drive Extent Pool Effective Capacity Logic 150 determines an effective capacity of the Drive Extent Pool 134 by first generating a Minimum Drive Count 152 that is equal to the total number of drive extents indicated by each RAID extent entry in RAID Mapping Table 138 plus one. For example, in the case of a 4D+1P RAID-5 configuration, in which each RAID extent entry indicates five drive extents, Drive Extent Pool Effective Capacity Logic 150 may generate Minimum Drive Count 152 by adding one to five, resulting in a Minimum Drive Count 152 of six. In another example, in the case of a 4D+2P RAID-6 configuration, in which each RAID extent entry indicates six drive extents, Drive Extent Pool Effective Capacity Logic 150 may generate Minimum Drive Count 152 by adding one to six, resulting in a Minimum Drive Count 152 of seven.

Drive Extent Pool Effective Capacity Logic 150 then selects a Sub-Group of Storage Drives 158 from Group of Storage Drive 130. For example, Drive Extent Pool Effective Capacity Logic 150 may select Sub-Group of Storage Drives 158 at least in part by storing into Sub-Group of Storage Drives 158 indications of storage drives in Group of Storage Drives 130 that have individual physical capacities that are not less than the physical capacity of any other storage drive in Group of Storage Drives 130. The total number of storage drives selected for and indicated by Sub-Group of Storage Drives 158 is equal to the Minimum Drive Count 152.

Drive Extent Pool Effective Capacity Logic 150 then assigns an individual effective capacity to each one of the storage drives contained in Sub-Group of Storage Drives 158. For example, Drive Extent Pool Effective Capacity Logic 150 may assign an individual effective capacity to each one of the storage drives contained in Sub-Group of Storage Drives 158 by storing an individual effective capacity for each one of the storage drives indicated by Sub-Group of Storage Drives 158 into Individual Drive Effective Capacities 160. The individual effective capacity assigned to each one of the storage drives contained in Sub-Group of Storage Drives 158 is equal to an individual physical capacity of a storage drive contained in Sub-Group of Storage Drives 158 that has a smallest individual physical capacity of any storage drive contained in Sub-Group of Storage Drives 158.

Drive Extent Pool Effective Capacity Logic 150 also assigns an individual effective capacity to each one of the storage drives in Group of Storage Drives 130 that is not contained in the Sub-Group of Storage Drives 158. For example, Drive Extent Pool Effective Capacity Logic 150 may assign an individual effective capacity to each one of the storage drives that is not contained in Sub-Group of Storage Drives 158 by storing an individual effective capacity for each one of the storage drives that is not indicated by Sub-Group of Storage Drives 158 into Individual Drive Effective Capacities 160. The individual effective capacity assigned to each one of the storage drives in Group of Storage Drives 130 that is not contained in Sub-Group of Storage Drives 158 is equal to the physical capacity of that storage drive. For example, a physical capacity of each storage drive in Group of Storage Drives 130 may be stored in Individual Drive Physical Capacities 154, and the individual effective capacity assigned to each one of the storage drives in Group of Storage Drives 130 that is not contained in Sub-Group of Storage Drives 158 may be the physical capacity of that storage drive contained in Individual Drive Physical Capacities 154.

Drive Extent Pool Effective Capacity Logic 150 then generates Total Group Effective Capacity 162, which is the total effective capacity of Group of Storage Drives 130. Drive Extent Pool Effective Capacity Logic 150 may generate Total Group Effective Capacity 162 by generating a sum of the all the individual effective capacities assigned to the storage drives in the Group of Storage Drives 130, e.g. a sum of all the individual effective capacities stored into Individual Drive Effective Capacities 160.

Drive Extent Pool Effective Capacity Logic 150 then sets the effective capacity of the Drive Extent Pool 134 to the total effective capacity of the Group of Storage Drives 130, e.g. by setting Drive Extent Pool Effective Capacity 164 to the value of Total Group Effective Capacity 162.

In some embodiments, Drive Extent Pool Effective Capacity Logic 150 selects the Sub-Group of Storage Drives 158 from the Group of Storage Drives 130 at least in part by creating a sorted drive list representing each of the individual storage drives in the Group of Storage Drives 130, shown by Sorted Drive List 156. Indications of the storage drives in Group of Storage Drives 130 stored in Sorted Drive List 156 are sorted in descending order of storage drive physical capacity, such that storage drives in the Group of Storage Drives 130 with higher individual physical capacities are represented closer to the top of Sorted Drive List 156. Drive Extent Pool Effective Capacity Logic 150 then selects the Sub-Group of Storage Drives 158 using Sorted Drive List 156, e.g. by selecting a number of storage drives represented at the top of the Sorted Drive List 156 equal to the Minimum Drive Count 152.

While only a single group of storage drives is shown in FIG. 1, the disclosed technology is not limited to operation with a single group of storage drives. Alternatively, Array of Physical Non-Volatile Data Storage Drives 128 may include multiple groups of storage drives that are connected to the Storage Processor 120. In such cases, a total group effective capacity may be determined for each one of the multiple groups of storage drives, and the Drive Extent Pool Effective Capacity 164 may be set to a sum of the total effective capacities of the multiple groups of storage drives.

Figure 2:
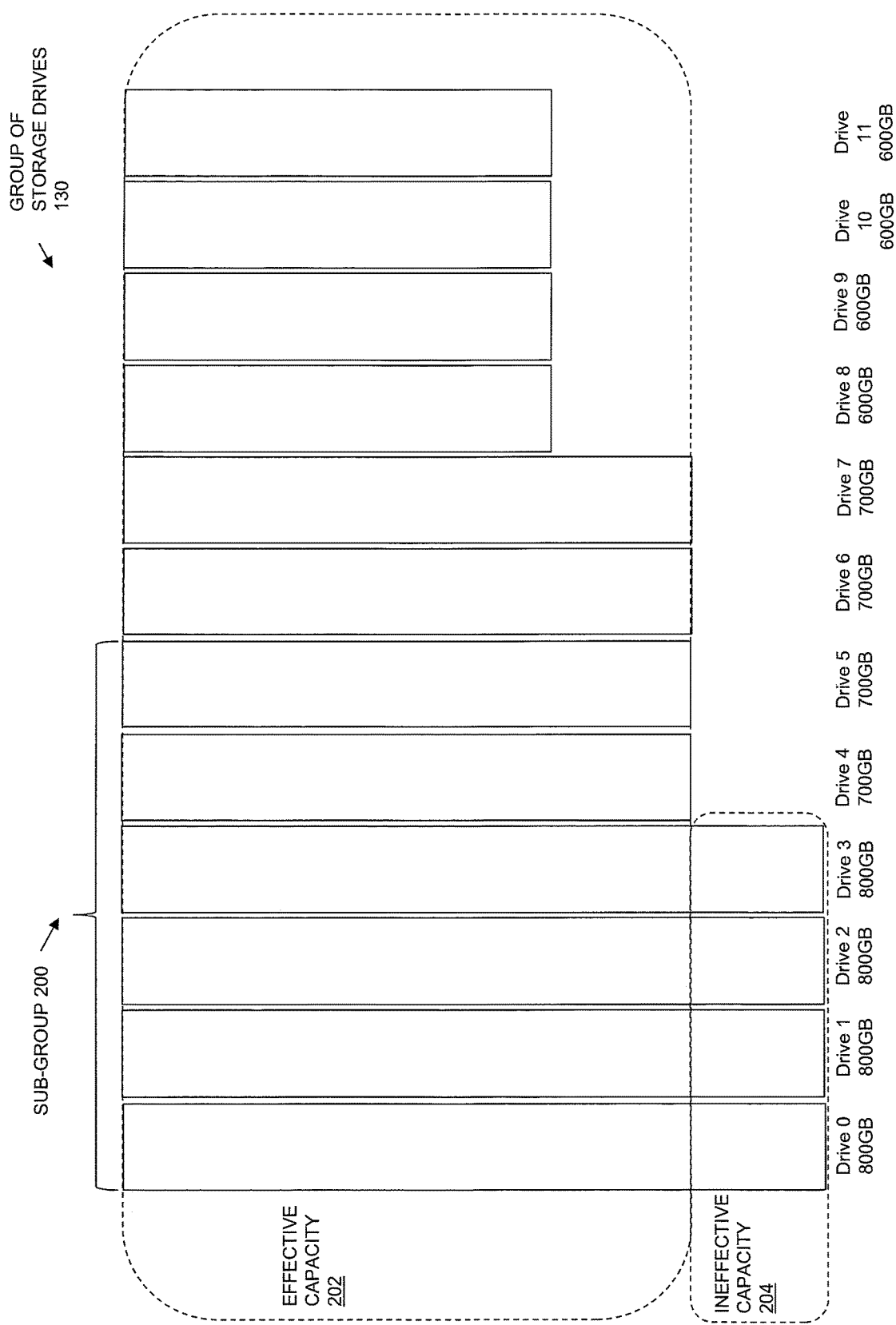
FIG. 2 is a block diagram showing an example of a group of storage drives.

FIG. 2 is a block diagram showing an example of Group of Storage Drives 130. In the example of FIG. 2, Group of Storage Drives 130 includes four storage drives that each have 800 gigabytes of physical capacity, i.e. Drive 0, Drive 1, Drive 2 and Drive 3. Further in FIG. 2, Group of Storage Drives 130 includes four storage drives that each have 700 gigabytes of physical capacity, i.e. Drive 4, Drive 5, Drive 6, and Drive 7. Finally, the example of Group of Storage Drives 130 shown in FIG. 2 includes four storage drives that each have 600 gigabytes of physical capacity, i.e. Drive 8, Drive 9, Drive 10, and Drive 11.

A Sub-Group 200 shown in FIG. 2 is an example of storage drives contained in Sub-Group of Storage Drives 158 in a 4D+1P RAID-5 configuration, in which Minimum Drive Count 152 is equal to six. As shown in FIG. 2, the storage drives contained in Sub-Group 200 are six storage drives in the example of Group of Storage Drives 130 shown in FIG. 2 that each have a physical capacity that is not less than the physical capacity of any storage drive not contained in Sub-Group 200, e.g. Drive 0, Drive 1, Drive 2, Drive 3, Drive 4, and Drive 5, having respective physical capacities of 800 gigabytes, 800 gigabytes, 800 gigabytes, 800 gigabytes, 600 gigabytes, and 600 gigabytes.

As also shown in FIG. 2, the Effective Capacity 202 of the storage drives in Group of Storage Drives 130 shows that the effective capacity assigned to each one of the storage drives in Sub-Group 200 is 700 gigabytes, which is equal to the physical capacity of a storage drive contained in Sub-Group 200 having the lowest physical capacity of any storage drive contained in Sub-Group 200, e.g. equal to the physical capacity of either Drive 4 or Drive 5, which each have a physical capacity of 700 gigabytes. As further shown in FIG.

2, the Effective Capacity 202 shows that each one of the storage drives in Group of Storage Drives 130 that are not contained in Sub-Group 200 is assigned an effective capacity equal to their respective physical capacity, e.g. the effective capacity of Drive 6 is 700 gigabytes, the effective capacity of Drive 7 is 700 gigabytes, and the effective capacities of Drive 8, Drive 9, Drive 10, and Drive 11 are each 600 gigabytes. Ineffective Capacity 204 shows that each one of Drive 0, Drive 1, Drive 2, and Drive 3 have 100 gigabytes of ineffective capacity.

Figure 3:
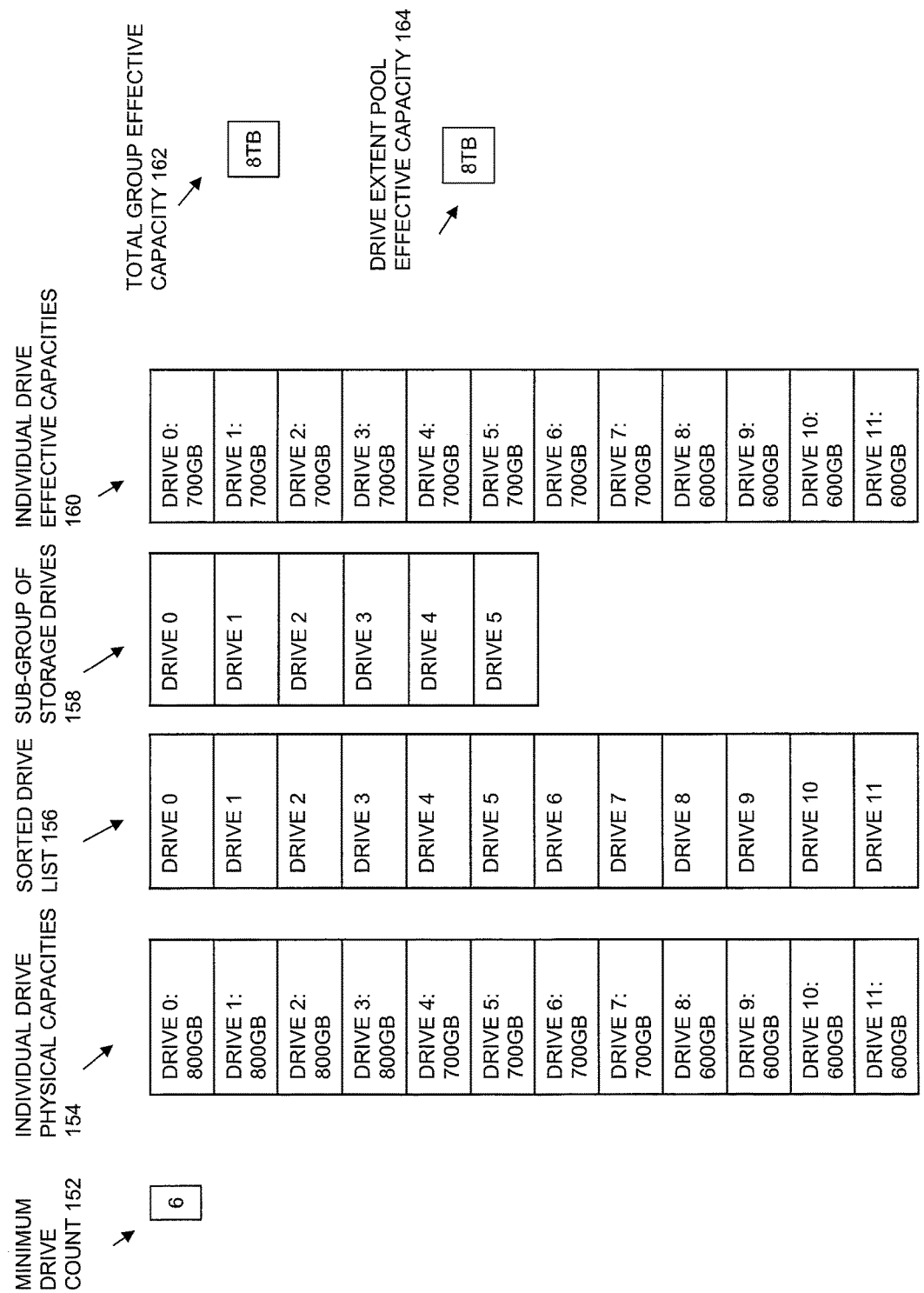
FIG. 3 is a block diagram showing an example of a minimum drive count, individual drive physical capacities, sorted drive list, sub-group of storage drives, individual drive effective capacities, total group effective capacity, and drive extent pool effective capacity for the group of storage drives shown in FIG. 2.

FIG. 3 is a block diagram showing an example of Minimum Drive Count 152, Individual Drive Physical Capacities 154, Sorted Drive List 156, Sub-Group of Storage Drives 158, Individual Drive Effective Capacities 160, Total Group Effective Capacity 162, and Drive Extent Pool Effective Capacity 164 for the example of Group of Storage Drives 130 shown in FIG. 2. As shown in FIG. 3, an example value of Minimum Drive Count 152 for a configuration that uses 4D+1P RAID-5 is 6. As also shown in FIG. 3, an example of Individual Drive Physical Capacities 154 stores a physical capacity of 800 gigabytes for each one of Drive 0, Drive 1, Drive 2, and Drive 3, a physical capacity of 700 gigabytes for each one of Drive 4, Drive 5, Drive 6 and Drive 7, and a physical capacity of 600 gigabytes for each one of Drive 8, Drive 9, Drive 10, and Drive 11. Further shown in FIG. 3, Sorted Drive List 156 stores indications of the storage drives in the example of Group of Storage Drives 130 shown in FIG. 2 sorted in descending order of their physical capacities, e.g. Drive 0, Drive 1, Drive 2, Drive 3, Drive 4, Drive 5, Drive 6, Drive 7, Drive 8, Drive 9, Drive 10, and Drive 11. The Sub-Group of Storage Drives 158 for the example Group of Storage Drives 130 shown in FIG. 2 includes indications of Drive 0, Drive 1, Drive 2, Drive 3, Drive 4, and Drive 5, e.g. the six storage drives indicated at the top of Sorted Drive List 156. The Individual Drive Effective Capacities 160 for the example of Group of Storage Drives 130 shown in FIG. 2 stores an effective capacity of 700 gigabytes for each one of the storage drives contained in Sub-Group of Storage Drives 158, i.e. for each of Drive 0, Drive 1, Drive 2, Drive 3, Drive 4, and Drive 5, since 700 gigabytes is the physical capacity of a physical drive contained in Sub-Group of Storage Drives 158 that has the smallest physical capacity of the storage drives contained in Sub-Group of Storage Drives 158 (e.g. either Drive 4 or Drive 5). The Individual Drive Effective Capacities 160 for the example Group of Storage Drives 130 shown in FIG. 2 stores an effective capacity for each storage drive not contained in Sub-Group of Storage Drives 158 that is equal to the respective physical capacity of that storage drive, e.g. an effective capacity of 700 gigabytes for each of Drive 6 and Drive 7, and an effective capacity of 600 gigabytes for each of Drive 8, Drive 9, Drive 10, and Drive 11. The value of Total Group Effective Capacity 162 for the example of Group of Storage Drives 130 shown in FIG. 2 is the sum of all the effective capacities stored in Individual Drive Effective Capacities 160, e.g. 8 terabytes. In an example in which the only group of storage drives is the Group of Storage Drives 130 shown in FIG. 2, the value of Drive Extent Pool Effective Capacity 164 is also set to 8 terabytes.

Figure 4:
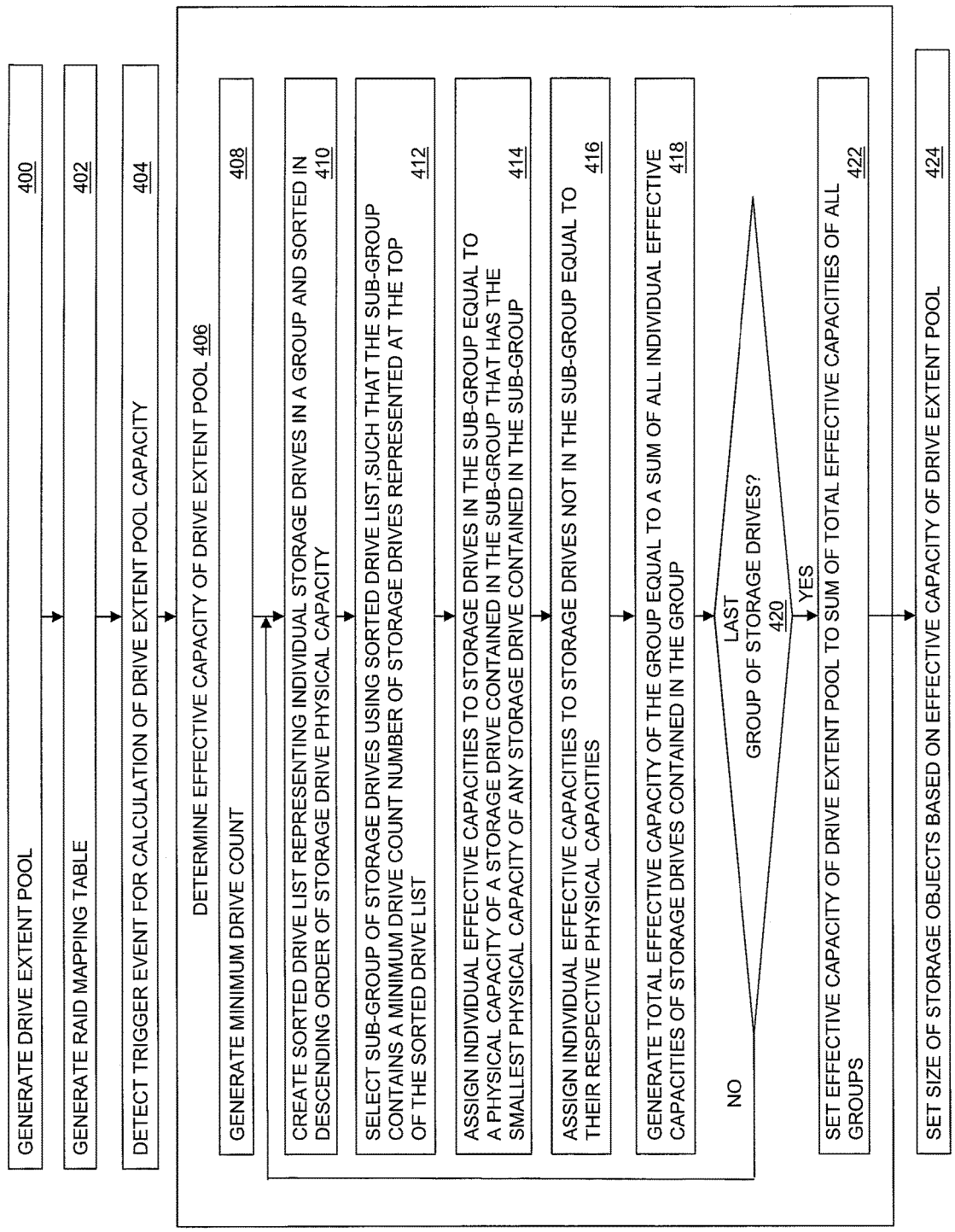
FIG. 4 is a flow chart showing an example of steps performed during operation of some embodiments.

FIG. 4 is a flow chart showing an example of steps performed during operation of some embodiments. At step 400, a drive extent pool is generated, such as the Drive Extent Pool 134 shown in FIG. 1. At step 402, a RAID mapping table is generated, such as the RAID Mapping Table 138 shown in FIG. 1.

At step 404, a trigger event is detected that causes the storage processor to determine the effective capacity of the drive extent pool. For example, such a trigger event may include the storage processor detecting a change in the number of storage drives that are connected to the storage processor. The storage processor may detect a change in the number of storage drives connected to the storage processor by detecting that at least one new storage drive has been added to the Array of Physical Non-Volatile Data Storage Drives 128 shown in FIG. 1, such that the total number of storage drives in the Array of Physical Non-Volatile Data Storage Drives 128 is increased. Alternatively, the storage processor may detect a change in the total number of storage drives connected to the storage processor by detecting that at least one storage drive has been removed from the Array of Physical Non-Volatile Data Storage Drives 128 shown in FIG. 1, such that the total number of storage drives in the Array of Physical Non-Volatile Data Storage Drives 128 is decreased.

In response to the trigger event detected at step 404, at step 406 the effective capacity of the drive extent pool is determined. At step 408, a minimum drive count is generated, e.g. as a value equal to the total number of drive extents indicated by each RAID extent entry in the RAID Mapping Table 138 plus 1. At step 410, a sorted drive list representing individual storage drives a group of storage drives is created. The sorted drive list created at step 410 is sorted in descending order of storage drive physical capacity. At step 412, a sub-group of storage drives is selected. The sub-group of storage drives selected at step 412 may be selected such that the sub-group of storage drives contains a minimum drive count number of storage drives from the group of storage drives, and such that each storage drive contained in the sub-group of storage drives has a physical capacity that is not less than the physical capacity of any storage drive in the group of storage drives that is not contained in the sub-group of storage drives. For example, the sub-group of storage drives may be selected at step 412 by selecting a number of storage drives indicated at the top of the sorted drive list that is equal to the minimum drive count.

At step 414, individual effective capacities are assigned to the individual storage drives that are contained in the sub-group of storage drives selected at step 412. The individual effective capacity assigned to each one of the storage drives in the sub-group is equal to a physical capacity of a storage drive contained in the sub-group that has the smallest physical capacity of any storage drive contained in the sub-group.

At step 416, individual effective capacities are assigned to the storage drives that are not contained the sub-group of storage drives selected at step 412. The individual effective capacity assigned to each one of the storage drives not contained in the sub-group is equal to the respective physical capacity of that storage drive.

At step 418 the total effective capacity of the group of storage drives is generated by summing all the individual storage drive effective capacities assigned in step 414 and step 416.

At step 420, the storage processor (e.g. Drive Extent Pool Effective Capacity Logic 150) determines whether the group of storage drives processed in steps 410, 412, 414, 416, and 418 is the last group of storage drives, e.g. is the last one of multiple groups of storage drives, or is the only group of storage drives. If the group of storage drives is the only group of storage drives, or is the last one of multiple groups of storage drives, then step 420 is following by step 422, in which the effective capacity of the drive extent pool is set to a sum of the total effective capacities of all the multiple groups of storage drives in the case of multiple groups of storage drives, or to the total effective capacity of the single group of storage drives. Otherwise, step 420 is followed by step 410, and steps 410, 412, 414, 416, and 418 are performed for a next group of storage drives, and so on until all groups of storage drives have been processed.

Step 422 is followed by step 424, in which one or more storage objects exposed to host I/O operations and used to store host data are defined with a size or sizes that are set based on the effective capacity of the drive extent pool determined at step 422. For example, in order to ensure that sufficient drive extents are available from the drive extent pool to process host I/O operations directed to the storage object, a storage object such as LUN 144 may be created with a capacity for storing host data that is set to a value that is some pre-determined amount less than the effective capacity determined for the drive extent pool. For example, in the case of a configuration using 4D+1P RAID-5, LUN 144 may be created with a size that is not greater than the effective capacity of the drive extent pool, minus some pre-determined amount of reserved drive extent pool capacity for free drive extents that are used to replace drive extents that are located in a failed drive during the recovery process performed in response to a drive failure, and also minus the one fifth of the remaining drive extents that are allocated from the drive extent pool and used to store parity information for use during the recovery process to recover the data stored on the drive extents located on the failed drive. For example, the predetermined amount of capacity reserved in the drive extent pool for free drive extents that are to be used to replace drive extents located in a failed drive in the event of a drive failure may be equal to the number of drive extents contained within the effective capacity of the storage drive having the largest physical capacity in the group of storage drives. In another example, in the case of a configuration using 4D+2P RAID-6, LUN 144 may be created with a size that is not greater than the effective capacity of the drive extent pool, minus the capacity reserved in the drive extent pool for free drive extents to be used to replace drive extents located in a failed drive during the drive recovery process, and also minus the one third of the remaining drive extents that are allocated from the drive extent pool and used to store parity information.

Figure 5:
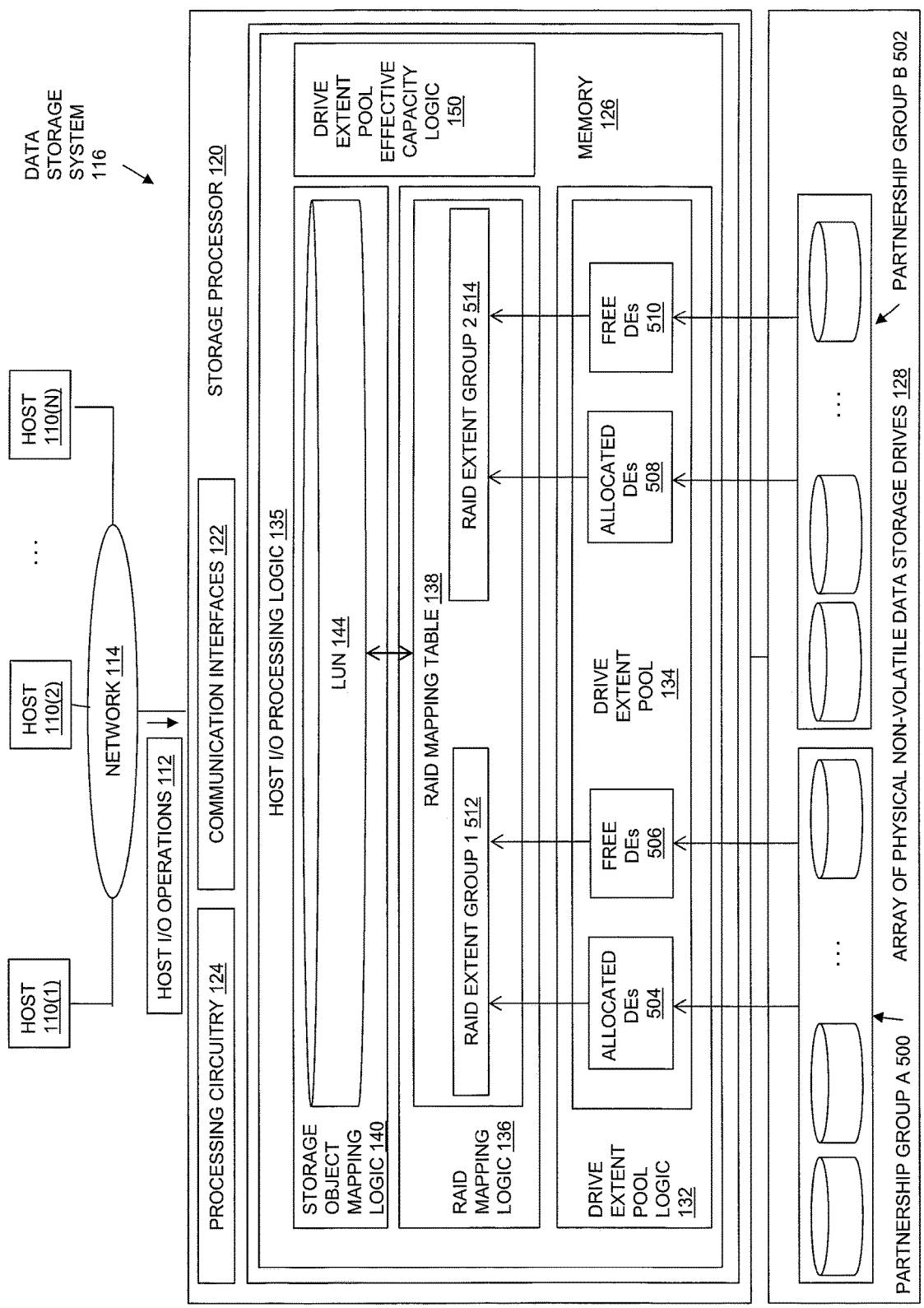
FIG. 5 is a block diagram showing the operational environment for the disclosed technology of FIG. 1, albeit where the array of physical non-volatile storage drives includes multiple groups of storage drives.

FIG. 5 is a block diagram showing the operational environment for the disclosed technology of FIG. 1, albeit in which the Array of Physical Non-Volatile Storage Drives 128 includes multiple groups of storage drives, e.g. Partnership Group A 500 and Partnership Group B 502. In embodiments such as that shown in FIG. 5, the effective capacity of the Drive Extent Pool 134 is set by generating a total effective capacity of each group of Partnership Group A 500 and Partnership Group B 502, and then setting the effective capacity of the drive extent pool to the sum of the total effective capacities of Partnership Group A 500 and Partnership Group B 502.

As shown in FIG. 5, in some embodiments in which the Array of Physical Non-Volatile Data Storage Drives 128 contains multiple partnership groups of storage drives, the RAID extent entries in RAID Mapping Table 138 may be assigned to multiple RAID extent groups, as shown for example by RAID Extent Group 1 512 and RAID Extent Group 2 514. Each one of RAID Extent Group 1 512 and RAID Extent Group 2 514 contains multiple RAID extent entries, and corresponds to one of the partnership groups of storage drives. For example, RAID Extent Group 1 512 corresponds to Partnership Group A 500, and RAID Extent Group 2 514 corresponds to Partnership Group B 502.

The RAID extent entries in each RAID extent group only indicate drive extents that are located in storage drives that are contained in the corresponding one of the partnership groups. Accordingly, RAID extent entries in RAID Extent Group 1 512 only indicate drive extents in the Allocated Drive Extents 504, and all drive extents in Allocated Drive Extents 504 must be located in storage drives contained in Partnership Group A 500. Similarly, RAID extent entries in RAID Extent Group 2 514 only indicate drive extents in the Allocated Drive Extents 508, and all drive extents in Allocated Drive Extents 508 must be located in storage drives contained in Partnership Group B 502.

Again with reference to FIG. 5, drive extents located in storage drives that are contained in Partnership Group A 500 but are not allocated, i.e. that are not contained in Allocated Drive Extents 504, are shown by Free Drive Extents 506. Free Drive Extents 506 are available for allocation to RAID extent entries in RAID Extent Group 1 512. Similarly, those drive extents located in storage drives that are contained in Partnership Group B 502 but are not allocated, i.e. that are not contained in Allocated Drive Extents 508, are shown by Free Drive Extents 510. Free Drive Extents 510 are available for allocation to RAID extent entries in RAID Extent Group 2 514.

The unallocated drive extents in Free Drive Extents 506 are available to be allocated in response to detecting a failure of a storage drive contained in Partnership Group A 500, to one or more RAID extent entries in the RAID Extent Group 1 512, to replace drive extents located in the failed storage drive contained in Partnership Group A 500. Similarly, the unallocated drive extents in Free Drive Extents 510 are available as spare drive extents to be allocated in response to detecting a failure of a storage drive contained in Partnership Group B 502, to one or more RAID extent entries in the RAID Extent Group 2 514, to replace drive extents located in the failed storage drive contained in Partnership Group B 502.

Figure 6:
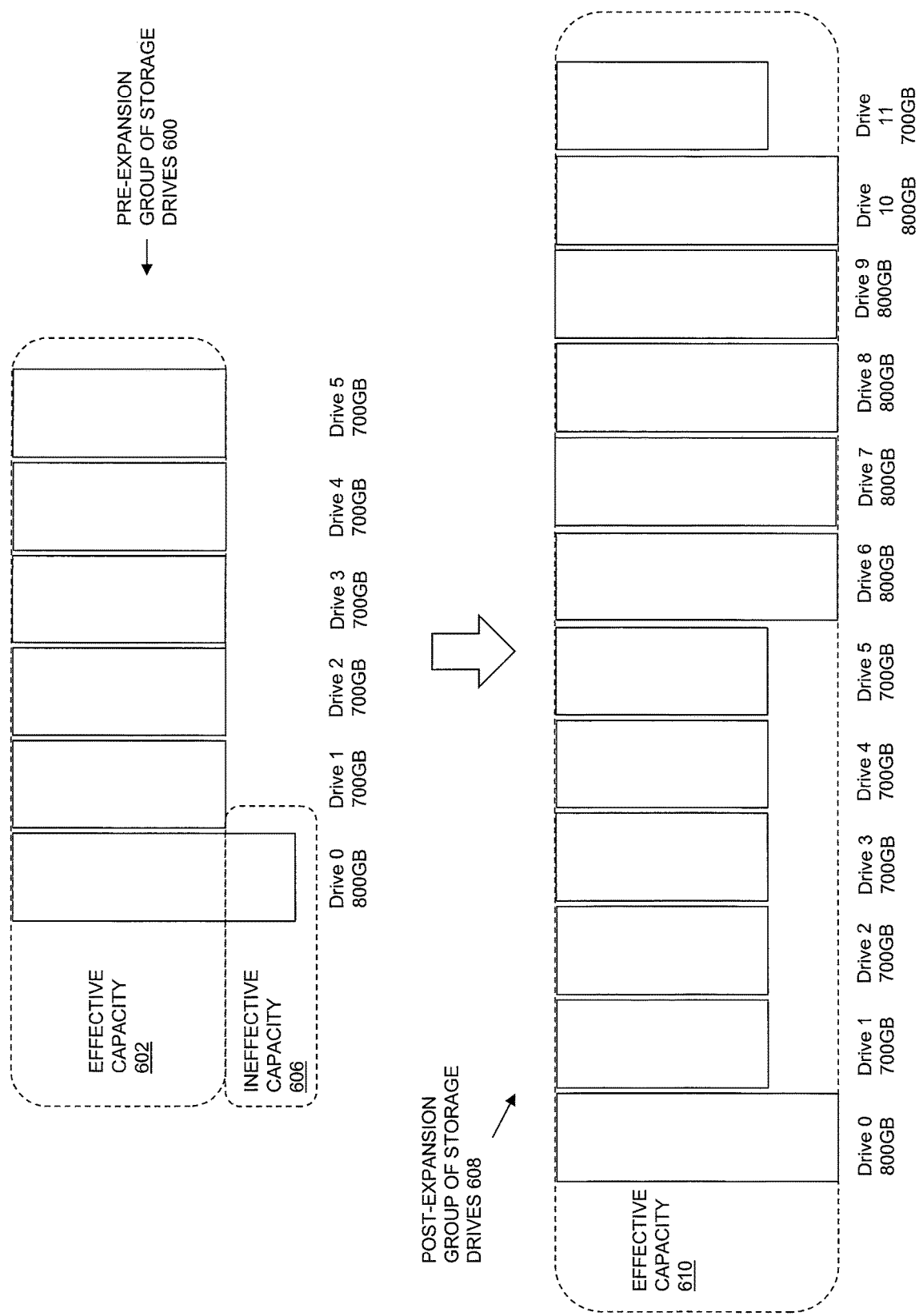
FIG. 6 is a block diagram showing a pre-expansion group of storage drives and a post-expansion group of storage drives.

FIG. 6 is a block diagram showing a Pre-Expansion Group of Storage Drives 600 and a Post-Expansion Group of Storage Drives 608. For example, Array of Physical Non-Volatile Data Storage Drives 128 initially contains Pre-Expansion Group of Storage Drives 600. Pre-Expansion Group of Storage Drives 600 includes one storage drive having a physical capacity of 800 gigabytes, i.e. Drive 0. Pre-Expansion Group of Storage Drives 600 further includes five storage drives that each have 700 gigabytes of physical capacity, i.e. Drive 1, Drive 2, Drive 3, Drive 4, and Drive 5. In a configuration using 4D+1P RAID-5, in which the minimum drive count is 6, the sub-group of storage drives selected from the Pre-Expansion Group of Storage Drives 600 includes all six storage drives in Pre-Expansion Group of Storage Drives 600, and Effective Capacity 602 shows that the effective capacity assigned to each storage drive in Pre-Expansion Group of Storage Drives 600 is 700 gigabytes. Ineffective Capacity 606 shows that Drive 0 contains 100 gigabytes of ineffective capacity.

Post-Expansion Group of Storage Drives 608 results after Drive 6, Drive 7, Drive 8, Drive 9, Drive 10, and Drive 11 have been added to Array of Physical Non-Volatile Data Storage Drives 128. Post-Expansion Group of Storage Drives 608 includes six storage drives having a physical capacity of 800 gigabytes, i.e. Drive 0, Drive 6, Drive 7, Drive 8, Drive 9, and Drive 10. Post-Expansion Group of Storage Drives 608 further includes six storage drives that each have 700 gigabytes of physical capacity, i.e. Drive 1, Drive 2, Drive 3, Drive 4, Drive 5, and Drive 11. In a configuration using 4D+1P RAID-5, in which the minimum drive count is 6, the sub-group of storage drives selected from the Post-Expansion Group of Storage Drives 608 includes all six storage drives in Post-Expansion Group of Storage Drives 608 that have a physical capacity of 800 gigabytes. Effective Capacity 610 shows that the effective capacity assigned to each storage drive in the sub-group is 800 gigabytes, and accordingly there is no ineffective capacity in Post-Expansion Group of Storage Drives 608.

Figure 7:
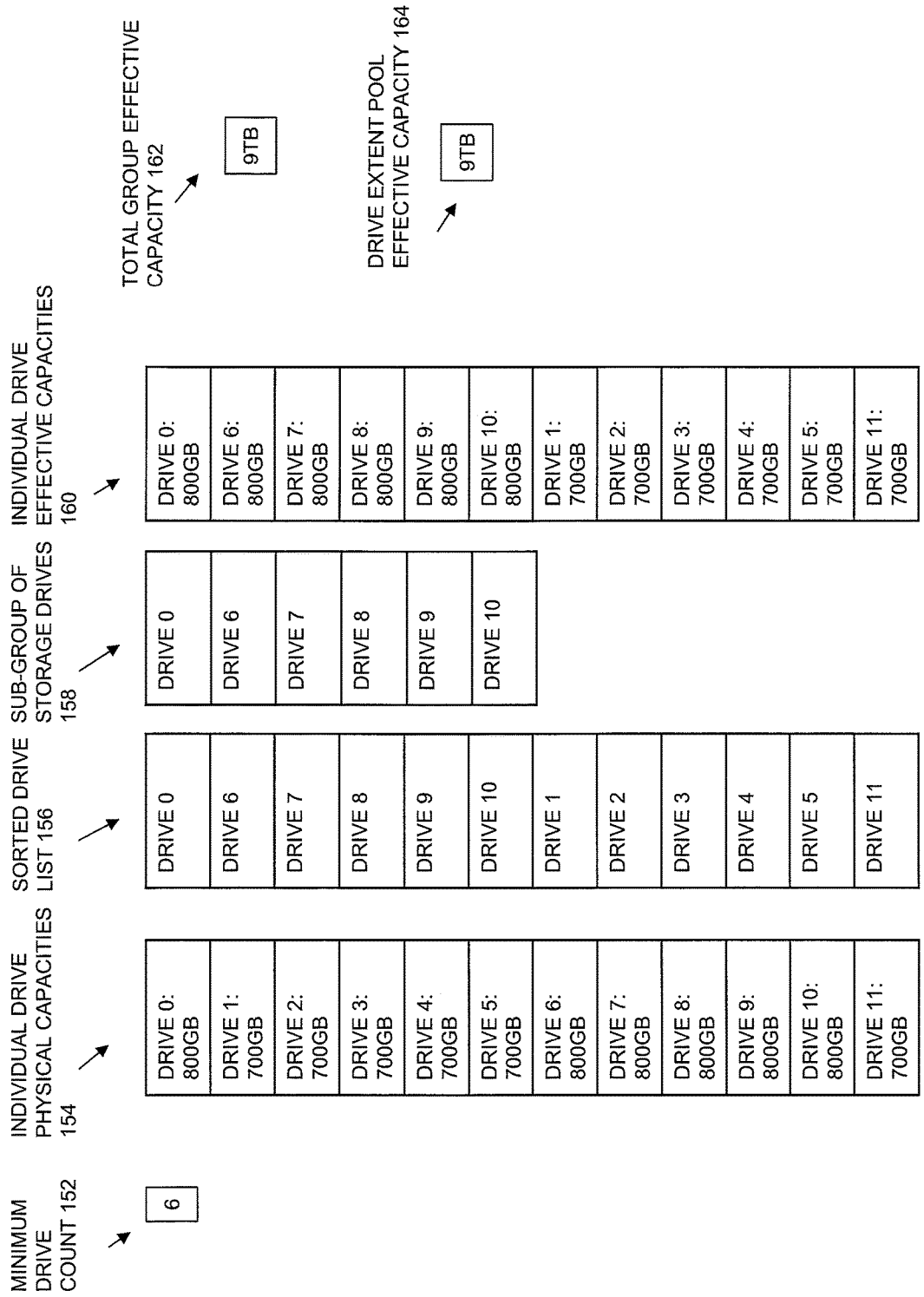
FIG. 7 is a block diagram showing an example of a minimum drive count, individual drive physical capacities, sorted drive list, sub-group of storage drives, individual drive effective capacities, total group effective capacity, and drive extent pool effective capacity for the post-expansion group of storage drives shown in FIG. 6.

FIG. 7 is a block diagram showing an example of Minimum Drive Count 152, Individual Drive Physical Capacities 154, Sorted Drive List 156, Sub-Group of Storage Drives 158, Individual Drive Effective Capacities 160, Total Group Effective Capacity 162, and Drive Extent Pool Effective Capacity 164 for the example of Post-Expansion Group of Storage Drives 608 shown in FIG. 6. As shown in FIG. 7, an example value of Minimum Drive Count 152 for a configuration that uses 4D+1P RAID-5 is 6. As also shown in FIG. 7, an example of Individual Drive Physical Capacities 154 stores a physical capacity of 800 gigabytes for each one of Drive 0, Drive 6, Drive 7, Drive 8, Drive 9, and Drive 10, and a physical capacity of 700 gigabytes for each one of Drive 1, Drive 2, Drive 3, Drive 4, Drive 5, and Drive 11. Further shown in FIG. 7, Sorted Drive List 156 stores indications of the storage drives in the example of Post-Expansion Group of Storage Drives 608 shown in FIG. 6 sorted in descending order of their physical capacities, e.g. Drive 0, Drive 6, Drive 7, Drive 8, Drive 9, Drive 10, Drive 1, Drive 2, Drive 3, Drive 4, Drive 5, and Drive 11. The Sub-Group of Storage Drives 158 for the Post-Expansion Group of Storage Drives 608 shown in FIG. 6 includes indications of Drive 0, Drive 6, Drive 7, Drive 8, Drive 9, and Drive 10, e.g. the six storage drives indicated at the top of Sorted Drive List 156. The Individual Drive Effective Capacities 160 for the example of Post-Expansion Group of Storage Drives 608 shown in FIG. 6 stores an effective capacity of 800 gigabytes for each one of the storage drives contained in Sub-Group of Storage Drives 158, i.e. for each of Drive 0, Drive 6, Drive 7, Drive 8, Drive 9, and Drive 10, since 800 gigabytes is the physical capacity of a physical drive contained in Sub-Group of Storage Drives 158 that has the smallest physical capacity of the storage drives contained in Sub-Group of Storage Drives 158 (e.g. any drive in Sub-Group of Storage Drives 158). The Individual Drive Effective Capacities 160 for the example Post-Expansion Group of Storage Drives 608 shown in FIG. 6 stores an effective capacity for each storage drive not contained in Sub-Group of Storage Drives 158 that is equal to the respective physical capacity of that storage drive, e.g. an effective capacity of 700 gigabytes for each of Drive 1, Drive 2, Drive 3, Drive 4, Drive 5, and Drive 11. The value of Total Group Effective Capacity 162 for the example of Post-Expansion Group of Storage Drives 608 shown in FIG. 6 is the sum of all the effective capacities stored in Individual Drive Effective Capacities 160, e.g. 9 terabytes. In an example in which the only group of storage drives is the Post-Expansion Group of Storage Drives 608 shown in FIG. 6, the value of Drive Extent Pool Effective Capacity 164 is also set to 9 terabytes.

Figure 8:
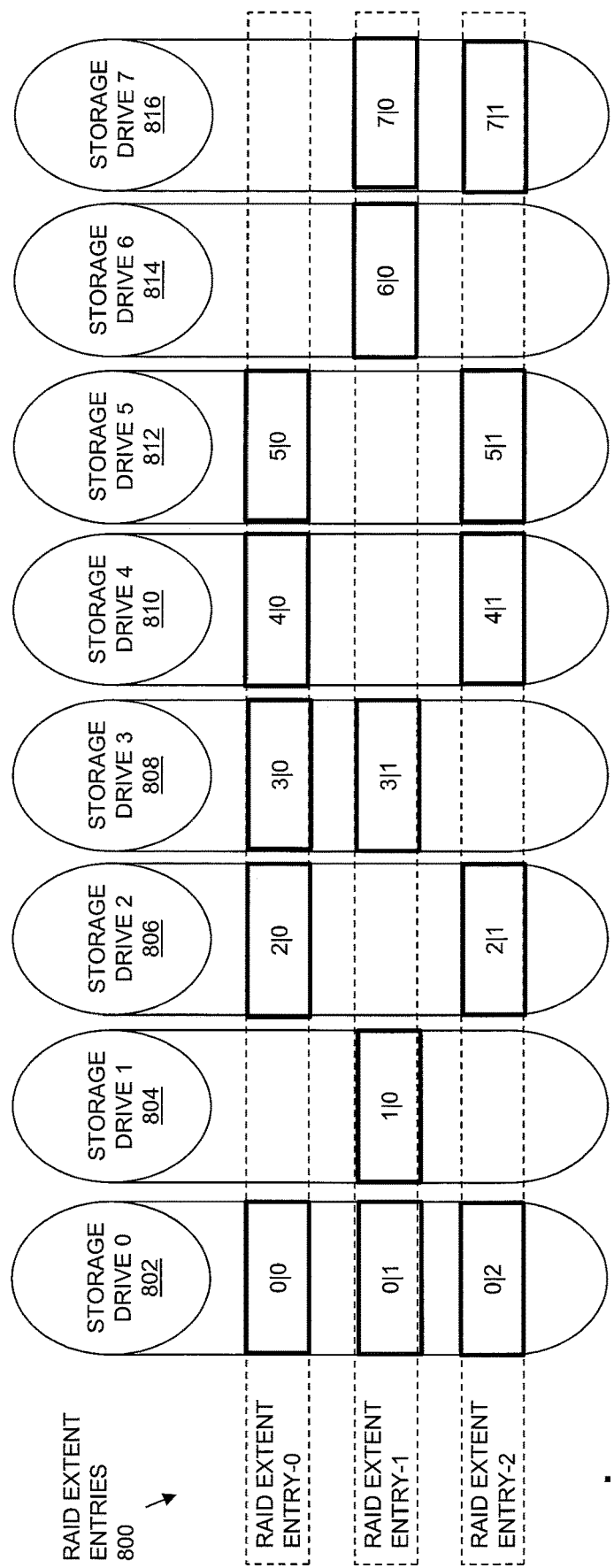
FIG. 8 is a block diagram showing an example of RAID extent entries in a RAID mapping table.

FIG. 8 is a block diagram showing an illustrative example of RAID Extent Entries 800, as may be contained in the RAID Mapping Table 138 in embodiments that provide 4D+1P RAID-5 striping and data protection. Storage Drive 0 802 through Storage Drive 7 816 shown in FIG. 8 may be part of a larger group of physical data storage drives.

As shown in the example of FIG. 8, RAID Extent Entries 800 includes a first RAID Extent Entry-0, a second RAID Extent Entry-1, and a third RAID Extent Entry-2. RAID Extent Entry-0, RAID Extent Entry-1, and RAID Extent Entry-2 may be the initial RAID extent entries in a larger total number of RAID extent entries in RAID Extent Entries 800 that are contained in the RAID Mapping Table 138. In order to provide 4D+1P RAID-5, each RAID extent entry in RAID Extent Entries 800 indicates five drive extents.

RAID Extent Entry-0 indicates a first drive extent 0|0, which is the first drive extent in Storage Drive 0 802, a second drive extent 2|0, which is the first drive extent in Storage Drive 2 806, a third drive extent 3|0, which is the first drive extent in Storage Drive 3 808, a fourth drive extent 4|0, which is the first drive extent in Storage Drive 4 810, and a fifth drive extent 5|0, which is the first drive extent in Storage Drive 5 812.

RAID Extent Entry-1 indicates a first drive extent 0|1, which is the second drive extent in Storage Drive 0 802, a second drive extent 1|0, which is the first drive extent in Storage Drive 1 804, a third drive extent 3|1, which is the second drive extent in Physical Drive 3 608, a fourth drive extent 6|0, which is the first drive extent in Storage Drive 6 814, and a fifth drive extent 7|0, which is the first drive extent in Storage Drive 7 816.

RAID Extent Entry-2 indicates a first drive extent 0|2, which is the third drive extent in Storage Drive 0 802, a second drive extent 2|1, which is the second drive extent in Storage Drive 2 806, a third drive extent 4|1, which is the second drive extent in Storage Drive 4 810, a fourth drive extent 5|1, which is the second drive extent in Storage Drive 5 812, and a fifth drive extent 7|1, which is the second drive extent in Storage Drive 8 616.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto programmable data processing apparatus to produce a machine, such that the instructions which execute on the programmable data processing apparatus create means for implementing the functions specified in the block or blocks. These computer program instructions may also be stored in a computer-readable memory that can direct a programmable data processing apparatus to function in a particular manner, such that the instructions stored in the computer-readable memory produce an article of manufacture including instruction means which implement the function specified in the block or blocks. The computer program instructions may also be loaded onto a programmable data processing apparatus to cause a series of operational steps to be performed on the programmable apparatus to produce a computer implemented process such that the instructions which execute on the programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method of providing RAID (Redundant Array of Independent Disks) data protection for at least one storage object in a data storage system, wherein the data storage system includes a storage processor and at least one group of storage drives communicably coupled to the storage processor, the method comprising:
   generating a drive extent pool from the at least one group of storage drives communicably coupled to the storage processor, wherein the drive extent pool indicates a plurality of drive extents located in the at least one group of storage drives, wherein each drive extent indicated by the drive extent pool comprises a contiguous region of non-volatile data storage located in one of the storage drives contained in the at least one group of storage drives, and wherein each drive extent has a size equal to a predetermined drive extent size;
   generating a RAID mapping table, wherein the RAID mapping table contains a plurality of RAID extent entries, wherein each RAID extent entry indicates a unique plurality of drive extents that are allocated from the drive extent pool to the RAID extent entry and that are used to persistently store host data written to a portion of an address space of the storage object corresponding to the RAID extent entry, and wherein each RAID extent entry indicates the same total number of drive extents; and
   determining an effective capacity of the drive extent pool at least in part by:
   i) generating a minimum drive count that is equal to the total number of drive extents indicated by each RAID extent entry plus one,
   ii) selecting a sub-group of storage drives from the group of storage drives, wherein the selected sub-group contains storage drives in the group of storage drives having individual physical capacities that are not less than the physical capacity of any storage drive not contained in the selected sub-group, and wherein a total number of storage drives contained in the selected sub-group is equal to the minimum drive count;
   iii) assigning an individual effective capacity to each one of the storage drives contained in the selected sub-group, wherein the individual effective capacity assigned to each one of the storage drives contained in the selected sub-group is equal to an individual physical capacity of a storage drive contained in the selected sub-group that has a smallest individual physical capacity of any storage drive contained in the selected sub-group,
   iv) assigning an individual effective capacity to each one of the storage drives in the group of storage drives that is not contained in the selected sub-group, wherein the individual effective capacity assigned to each one of the storage drives in the group of storage drives that is not contained in the selected sub-group is equal to that to the physical capacity of that storage drive,
   v) generating a total effective capacity of the group of storage drives that is equal to a sum of the all the individual effective capacities assigned to the storage drives in the group of storage drives, and
   vi) setting the effective capacity of the drive extent pool to the total effective capacity of the group of storage drives.

2. The method of claim 1, wherein selecting the sub-group of storage drives from the group of storage drives further comprises:
   creating a sorted drive list representing each of the individual storage drives in the group of storage drives, wherein the sorted drive list is sorted in descending order of storage drive physical capacity, such that storage drives in the group of storage drives with higher individual physical capacities are represented closer to a top of the sorted drive list; and
   selecting the sub-group of storage drives using the sorted drive list, wherein the storage drives contained in the selected sub-group are represented towards the top of the sorted drive list.

3. The method of claim 2, wherein the at least one group of storage drives comprises a plurality of groups of storage drives; and
   wherein setting the effective capacity of the drive extent pool to the total effective capacity of the group of storage drives further comprises i) generating a total effective capacity of each group of storage drives in the plurality of groups of storage drives, ii) generating a sum of the total effective capacities of the plurality of groups of storage drives, and iii) setting the effective capacity of the drive extent pool to the sum of the total effective capacities of the plurality of groups of storage drives.

4. The method of claim 3, further comprising:
   detecting a change in a total number of storage drives communicably coupled to the storage processor; and
   wherein determining the effective capacity of the drive extent pool is performed in response to detecting the change in the total number of storage drives communicably coupled to the storage processor.

5. The method of claim 4, wherein detecting the change in the total number of storage drives communicably coupled to the storage processor comprises detecting that at least one new storage drive has been added to the storage drives communicably coupled to the storage processor, such that the total number of storage drives communicably coupled to the storage processor is increased.

6. The method of claim 4, wherein detecting the change in the total number of storage drives communicably coupled to the storage processor comprises detecting that at least one storage drive has been removed from the storage drives communicably coupled to the storage processor, such that the total number of storage drives communicably coupled to the storage processor is decreased.

7. The method of claim 3, further comprising using the effective capacity of the drive extent pool to set a size of the storage object, such that the size of the storage object is set to a value that is less than the effective capacity for the drive extent pool.

8. The method of claim 3, wherein the plurality of groups of storage drives comprises a plurality of partnership groups including at least a first partnership group and a second partnership group;
   wherein a plurality of unallocated drive extents located in storage drives contained in the first partnership group are available as free drive extents to be allocated, in response to detecting a failure of a storage drive contained in the first partnership group, to replace drive extents located in the failed storage drive contained in the first partnership group; and
   wherein a plurality of unallocated drive extents located in storage drives contained in the second partnership group are available as free drive extents to be allocated, in response to detecting a failure of a storage drive contained in the second partnership group, to replace drive extents located in the failed storage drive contained in the second partnership group.

9. The method of claim 8, wherein drive extents are allocated to RAID extent entries in the RAID mapping table such that no two drive extents indicated by any single RAID extent entry are located on the same storage drive.

10. A data storage system that provides RAID (Redundant Array of Independent Disks) data protection for at least one storage object, comprising:
   at least one storage processor including processing circuitry and a memory;
   at least one group of storage drives communicably coupled to the storage processor; and
   wherein the storage processor is configured and arranged to:
      generate a drive extent pool from the at least one group of storage drives communicably coupled to the storage processor, wherein the drive extent pool indicates a plurality of drive extents located in the at least one group of storage drives, wherein each drive extent indicated by the drive extent pool comprises a contiguous region of non-volatile data storage located in one of the storage drives contained in the at least one group of storage drives, and wherein each drive extent has a size equal to a predetermined drive extent size;
      generate a RAID mapping table, wherein the RAID mapping table contains a plurality of RAID extent entries, wherein each RAID extent entry indicates a unique plurality of drive extents that are allocated from the drive extent pool to the RAID extent entry and that are used to persistently store host data written to a portion of an address space of the storage object corresponding to the RAID extent entry, and wherein each RAID extent entry indicates the same total number of drive extents; and
      Wherein to determine an effective capacity of the drive extent pool the storage processor is configured and arranged to:
         i) generate a minimum drive count that is equal to the total number of drive extents indicated by each RAID extent entry plus one,
         ii) select a sub-group of storage drives from the group of storage drives, wherein the selected sub-group contains storage drives in the group of storage drives having individual physical capacities that are not less than the physical capacity of any storage drive not contained in the selected sub-group, and wherein a total number of storage drives contained in the selected sub-group is equal to the minimum drive count;
         iii) assign an individual effective capacity to each one of the storage drives contained in the selected sub-group, wherein the individual effective capacity assigned to each one of the storage drives contained in the selected sub-group is equal to an individual physical capacity of a storage drive contained in the selected sub-group that has a smallest individual physical capacity of any storage drive contained in the selected sub-group,
         iv) assign an individual effective capacity to each one of the storage drives in the group of storage drives that is not contained in the selected sub-group, wherein the individual effective capacity assigned to each one of the storage drives in the group of storage drives that is not contained in the selected sub-group is equal to that to the physical capacity of that storage drive,
         v) generate a total effective capacity of the group of storage drives that is equal to a sum of the all the individual effective capacities assigned to the storage drives in the group of storage drives, and
         vi) set the effective capacity of the drive extent pool to the total effective capacity of the group of storage drives.

11. The data storage system of claim 10, wherein to select the sub-group of storage drives from the group of storage drives the storage processor is configured and arranged to:
   create a sorted drive list representing each of the individual storage drives in the group of storage drives, wherein the sorted drive list is sorted in descending order of storage drive physical capacity, such that storage drives in the group of storage drives with higher individual physical capacities are represented closer to a top of the sorted drive list; and
   select the sub-group of storage drives using the sorted drive list, wherein the storage drives contained in the selected sub-group are represented towards the top of the sorted drive list.

12. The data storage system of claim 11, wherein the at least one group of storage drives comprises a plurality of groups of storage drives; and
   wherein to set the effective capacity of the drive extent pool to the total effective capacity of the group of storage drives the storage processor is configured and arranged to i) generate a total effective capacity of each group of storage drives in the plurality of groups of storage drives, ii) generate a sum of the total effective capacities of the plurality of groups of storage drives, and iii) set the effective capacity of the drive extent pool to the sum of the total effective capacities of the plurality of groups of storage drives.

13. The data storage system of claim 12, wherein the storage processor is further configured and arranged to:
   detect a change in a total number of storage drives communicably coupled to the storage processor; and
   determine the effective capacity for the drive extent pool in response to detection of the change in the total number of storage drives communicably coupled to the storage processor.

14. The data storage system of claim 13, wherein to detect the change in the total number of storage drives communicably coupled to the storage processor the storage processor is configured and arranged to detect that at least one new storage drive has been added to the storage drives communicably coupled to the storage processor, such that the total number of storage drives communicably coupled to the storage processor is increased.

15. The data storage system of claim 13, wherein to detect the change in the total number of storage drives communicably coupled to the storage processor the storage processor is configured and arranged to detect that at least one storage drive has been removed from the storage drives communicably coupled to the storage processor, such that the total number of storage drives communicably coupled to the storage processor is decreased.

16. The data storage system of claim 12, wherein the storage processor is further configured and arranged to use the effective capacity of the drive extent pool to set a size of the storage object, such that the size of the storage object is set to a value that is less than the effective capacity of the drive extent pool.

17. The data storage system of claim 12, wherein the plurality of groups of storage drives comprises a plurality of partnership groups including at least a first partnership group and a second partnership group;
   wherein a plurality of unallocated drive extents located in storage drives contained in the first partnership group are available as free drive extents to be allocated, in response to detecting a failure of a storage drive contained in the first partnership group, to replace drive extents located in the failed storage drive contained in the first partnership group; and
   wherein a plurality of unallocated drive extents located in storage drives contained in the second partnership group are available as free drive extents to be allocated, in response to detecting a failure of a storage drive contained in the second partnership group, to replace drive extents located in the failed storage drive contained in the second partnership group.

18. The data storage system of claim 17, wherein drive extents are allocated to RAID extent entries in the RAID mapping table such that no two drive extents indicated by any single RAID extent entry are located on the same storage drive.

19. A non-transitory computer readable medium for providing RAID (Redundant Array of Independent Disks) data protection for at least one storage object, comprising instructions stored thereon, that when executed on processing circuitry in a storage processor, perform the steps of:

generating a drive extent pool from the at least one group of storage drives communicably coupled to the storage processor, wherein the drive extent pool indicates a plurality of drive extents located in the at least one group of storage drives, wherein each drive extent indicated by the drive extent pool comprises a contiguous region of non-volatile data storage located in one of the storage drives contained in the at least one group of storage drives, and wherein each drive extent has a size equal to a predetermined drive extent size;

generating a RAID mapping table, wherein the RAID mapping table contains a plurality of RAID extent entries, wherein each RAID extent entry indicates a unique plurality of drive extents that are allocated from the drive extent pool to the RAID extent entry and that are used to persistently store host data written to a portion of an address space of the storage object corresponding to the RAID extent entry, and wherein each RAID extent entry indicates the same total number of drive extents; and determining an effective capacity of the drive extent pool at least in part by:
   i) generating a minimum drive count that is equal to the total number of drive extents indicated by each RAID extent entry plus one,
   ii) selecting a sub-group of storage drives from the group of storage drives, wherein the selected sub-group contains storage drives in the group of storage drives having individual physical capacities that are not less than the physical capacity of any storage drive not contained in the selected sub-group, and wherein a total number of storage drives contained in the selected sub-group is equal to the minimum drive count,
   iii) assigning an individual effective capacity to each one of the storage drives contained in the selected sub-group, wherein the individual effective capacity assigned to each one of the storage drives contained in the selected sub-group is equal to an individual physical capacity of a storage drive contained in the selected sub-group that has a smallest individual physical capacity of any storage drive contained in the selected sub-group,
   iv) assigning an individual effective capacity to each one of the storage drives in the group of storage drives that is not contained in the selected sub-group, wherein the individual effective capacity assigned to each one of the storage drives in the group of storage drives that is not contained in the selected sub-group is equal to that to the physical capacity of that storage drive,
   v) generating a total effective capacity of the group of storage drives that is equal to a sum of the all the individual effective capacities assigned to the storage drives in the group of storage drives, and
   vi) setting the effective capacity of the drive extent pool to the total effective capacity of the group of storage drives.

* * * * *